US008250591B2

(12) United States Patent
Kirihara et al.

(10) Patent No.: US 8,250,591 B2
(45) Date of Patent: Aug. 21, 2012

(54) TRAY OF OPTICAL DISK DEVICE AND OPTICAL DISK DEVICE INCLUDING THE SAME

(75) Inventors: Sojiro Kirihara, Kawasaki (JP); Hiroshi Yamagishi, Chiba (JP); Koji Matsumoto, Ichikawa (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 435 days.

(21) Appl. No.: 12/425,720

(22) Filed: Apr. 17, 2009

(65) Prior Publication Data

US 2010/0031277 A1   Feb. 4, 2010

(30) Foreign Application Priority Data

Jul. 29, 2008  (JP) ................................. 2008-195386

(51) Int. Cl.
G11B 17/03  (2006.01)
(52) U.S. Cl. ........ 720/603; 720/600; 720/601; 720/611; 720/651
(58) Field of Classification Search .................. 720/600, 720/601, 603, 611, 651
See application file for complete search history.

(56) References Cited

U.S. PATENT DOCUMENTS

| 7,430,748 | B2 * | 9/2008 | Wu | 720/611 |
|---|---|---|---|---|
| 7,448,053 | B2 * | 11/2008 | Wu | 720/651 |
| 7,743,393 | B2 * | 6/2010 | Chang et al. | 720/603 |
| 7,827,571 | B2 * | 11/2010 | Yamauchi et al. | 720/651 |
| 2004/0133900 | A1 * | 7/2004 | Cho et al. | 720/603 |
| 2004/0158844 | A1 * | 8/2004 | Ohta et al. | 720/603 |
| 2004/0187142 | A1 * | 9/2004 | Namiki | 720/603 |
| 2005/0015782 | A1 * | 1/2005 | Wang | 720/603 |
| 2006/0090177 | A1 * | 4/2006 | Yamauchi et al. | 720/651 |
| 2006/0218564 | A1 * | 9/2006 | Kirihara et al. | 720/603 |
| 2006/0288358 | A1 * | 12/2006 | Wu | 720/649 |
| 2007/0288945 | A1 * | 12/2007 | Chang et al. | 720/603 |

FOREIGN PATENT DOCUMENTS

| CN | 1435838 A | 8/2003 |
|---|---|---|
| CN | 1508800 A | 6/2004 |
| JP | 2002-025240 | 1/2002 |
| JP | 2003-178570 | 6/2003 |
| JP | 2004-265544 | 9/2004 |

OTHER PUBLICATIONS

English translation of Chinese Second Office Action, issued in Chinese Patent Application No. 2009101130738.9, dated Mar. 7, 2012.

* cited by examiner

*Primary Examiner* — Hoai V Ho
*Assistant Examiner* — Pablo Huerta
(74) *Attorney, Agent, or Firm* — McDermott Will & Emery LLP (57) ABSTRACT

A tray of an optical disk device and an optical disk device including the tray are provided. In a tray rear portion located at a higher level than a tray bottom portion, a first tapered surface as a draft taper and a second tapered surface sloping more gently than the first tapered surface are formed. An upper end of the second tapered surface is located farther from a center of rotation of an optical disk than a lower end, and thus air in a peripheral portion of the optical disk generated during rotation of the disk is introduced along the tapered surface to a rear.

13 Claims, 9 Drawing Sheets

TRAY OF OPTICAL DISK DEVICE AND OPTICAL DISK DEVICE INCLUDING THE SAME

The present application claims priority from Japanese application JP2008-195386 filed on Jul. 29, 2008, the content of which is hereby incorporated by reference into this application.

TECHNICAL FIELD

The present invention relates to a tray of an optical disk device suitable for noise reduction.

BACKGROUND OF THE INVENTION

An optical disk device of this type plays back and records data by loading an optical disk such as a CD or a DVD on a tray and rotating it. In recent years, a rotational speed of the optical disk has been increasing and wind noise (air noise) thereof has been a problem. For example, a device disclosed in JP-A-2003-178570 tries to solve the problem with its structure of a tray.

The tray of JP-A-2003-178570 includes a portion for loading an optical disk, and a front portion and a rear portion around the loading portion at a one-step higher level. From a middle of the loading portion (a center of rotation of the optical disk) to a part of the rear portion, an opening for an optical pickup is formed. At an edge of the opening, a sloping surface is formed so as to form a space increasing from the optical disk toward the opening in order to prevent air noise generated by the rotation of the optical disk.

SUMMARY OF THE INVENTION

However, in such a structure of the tray, air is flown as the optical disk rotates and is once introduced along the sloping surface down into the opening. However, it again rises from the opening to come into collision with another inclined surface. Since turbulent airflow is generated on a side of the sloping surface where the air collides, the structure of the tray is insufficient for reducing air noise.

The present invention has an object to provide a tray of an optical disk, which can reliably reduce air noise, and an optical disk device including the tray.

To achieve the object, the present invention provides a tray of an optical disk device including: a tray bottom portion on which an optical disk inserted from a front is rotatably placed; and a tray rear portion adjacent to the tray bottom portion at the rear of a center of rotation of the optical disk and located at a higher level than the tray bottom portion. The tray rear portion includes: a first tapered surface rising a slope from the tray bottom portion and extending circumferentially of the optical disk; and a second tapered surface sloping more gently than the first tapered surface and formed so that an upper end thereof is located farther from the center of the rotation than a lower end thereof.

The tray of an optical disk device according to the present invention described above can ensure to reduce air noise.

Other objects, features and advantages of the invention will become apparent from the following description of the embodiments of the invention taken in conjunction with the accompanying drawings.

DETAILED DESCRIPTION OF THE INVENTION

A tray of an optical disk device according to a preferred embodiment of the present invention will be described with reference to the drawings. In the accompanying drawings, components are not shown in some views with actual thickness, size, and scaling for clear description. The device is described provided that an optical disk loaded rotates clockwise, and the optical disk is inserted from a front, while the invention is not limited thereto.

Figure 1:
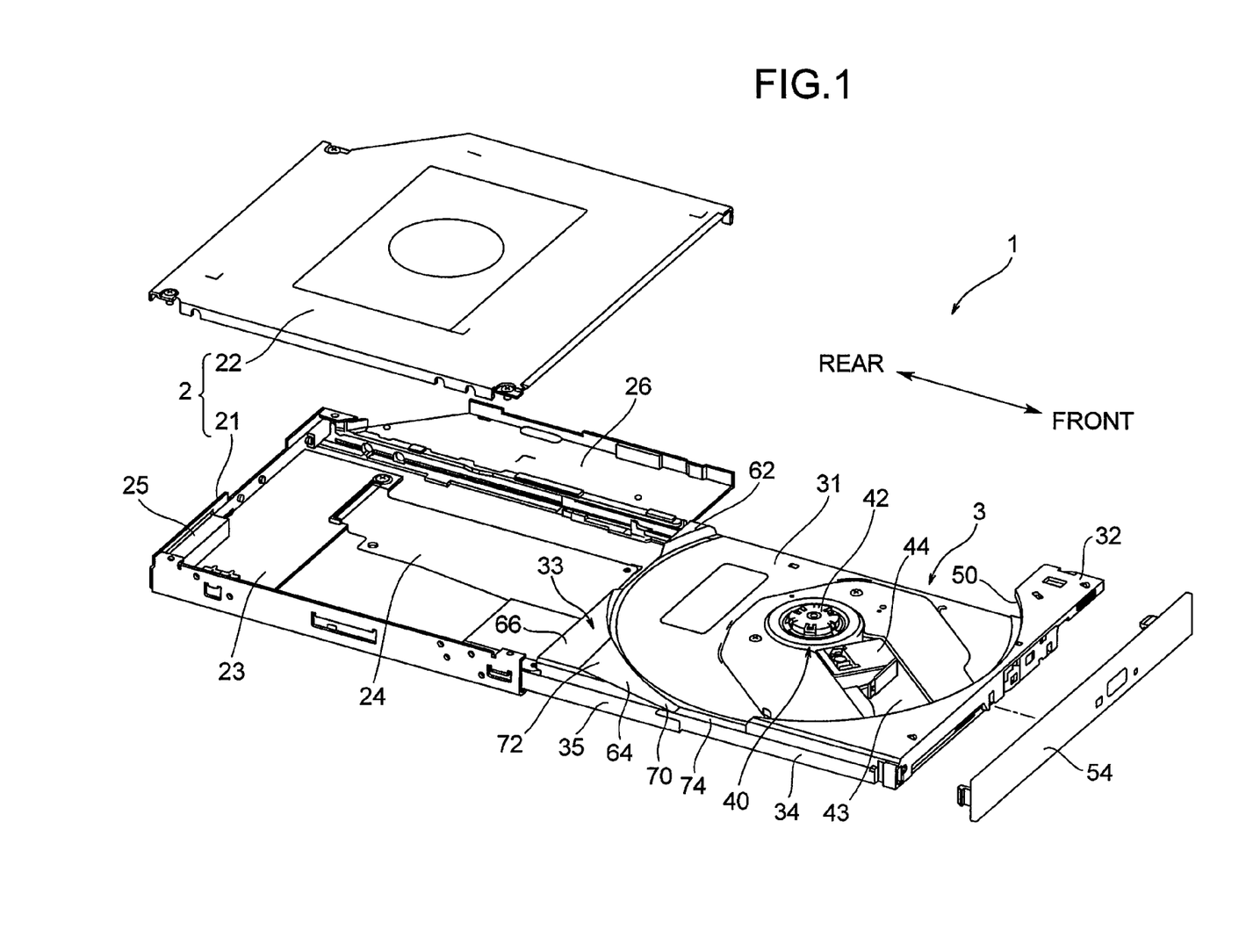
FIG. 1 is an exploded perspective view of an optical disk device according to an embodiment.
Figure 2:
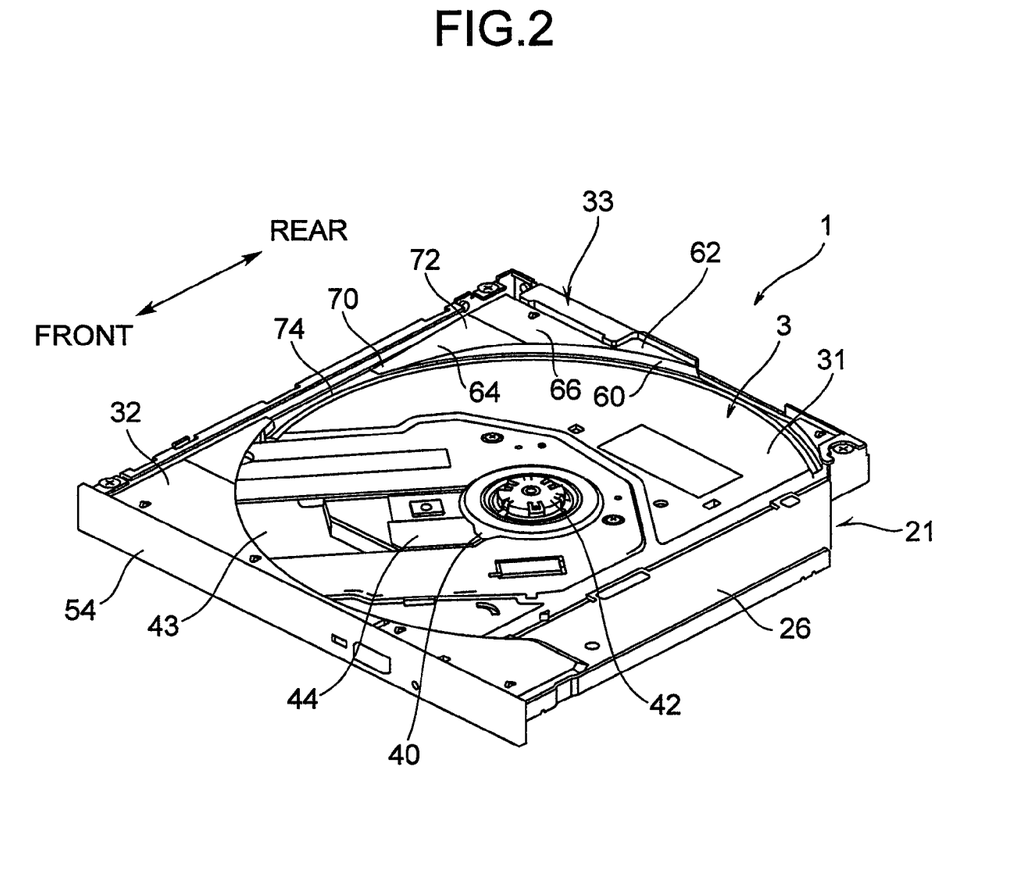
FIG. 2 is a perspective view of the optical disk device in FIG. 1 with a top case being omitted.

As shown in FIGS. 1 and 2, an optical disk device 1 includes a casing 2, and a tray 3 which can be inserted and retracted into/from the casing 2. The casing 2 is in a form of a box including a bottom case 21 and a top case 22. The tray 3 is inserted and retracted into/from the casing 2 through an opening on a front side of the casing 2. The bottom case 21 and the top case 22 are secured by e.g. screws at e.g. three corners.

A circuit board 23 including various drive circuits, such as a motor drive circuit, is horizontally mounted on the rear of the bottom case 21. A flexible substrate 24 is connected to the circuit board 23 so as to extend forward. A connector portion 25 for connecting to other devices (e.g. a personal computer body) is formed on the left rear of the bottom case 21 so as to protrude forward. A wing portion 26, which a part of an optical disk 100 (see FIG. 6) faces, is formed on the right side of the bottom case 21.

Figure 3:
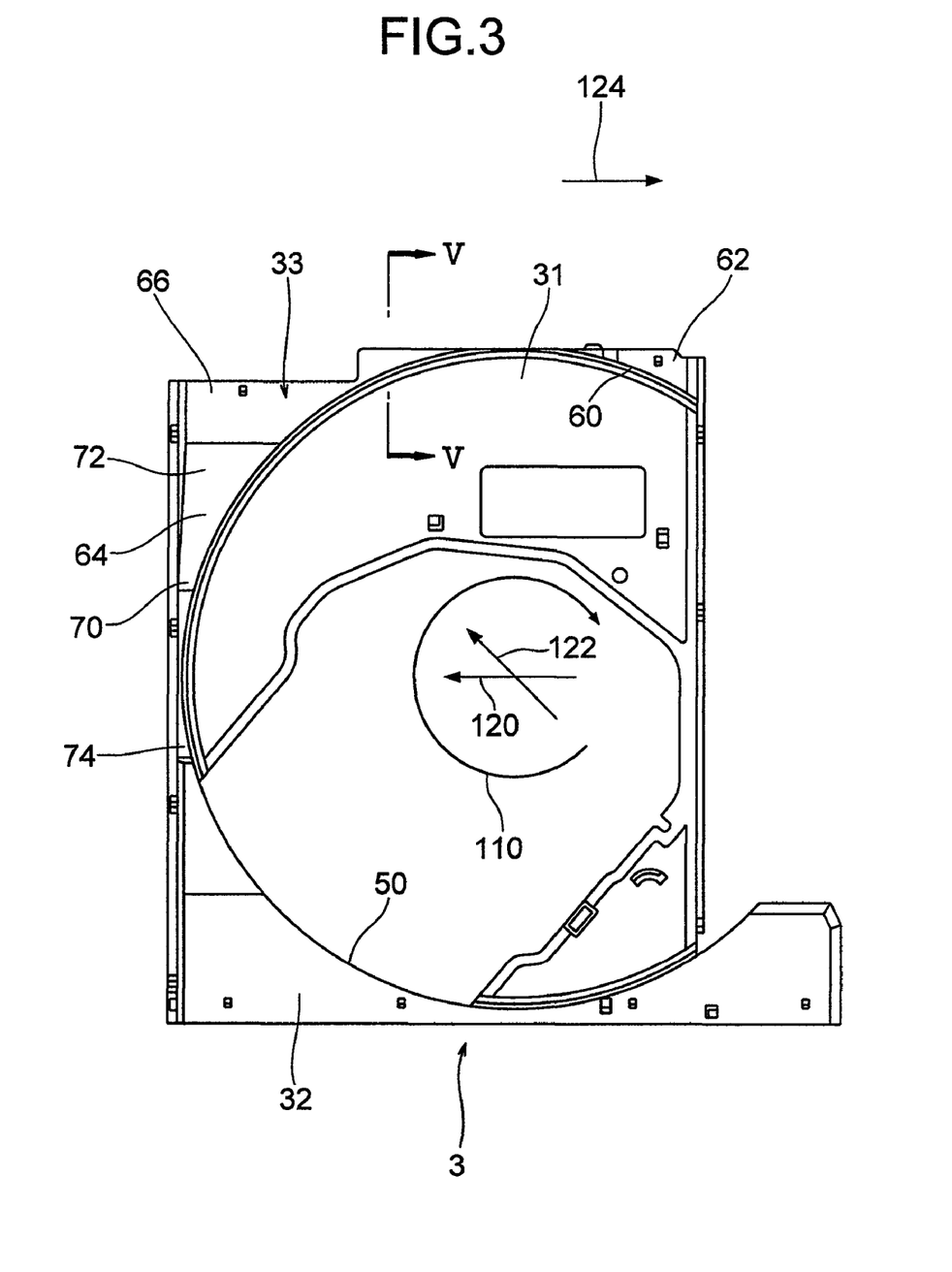
FIG. 3 is a plan view of a tray of the optical disk device in FIG. 1.

As shown in FIGS. 1 to 4, the tray 3 includes a tray bottom portion 31, a tray front portion 32, and a tray rear portion 33. The tray front portion 32 and the tray rear portion 33 are formed to rise from the tray bottom portion 31, and the tray bottom portion 31 constitutes a recess in the entire tray 3. A guide rail 34 is provided on right and left sides along an inserting and retracting direction (fore/aft direction) of the tray 3. A moving rail 35 is provided to move on the guide rail 34. In FIG. 3, the guide rail 34 and the moving rail 35 are omitted.

The tray bottom portion 31 is constituted by a flat surface facing a recording surface of the optical disk 100, and the optical disk 100 is rotatably placed on the tray bottom portion 31. The tray bottom portion 31 has a circular outer periphery corresponding to a shape of the optical disk 100. A disk motor 40 for rotating the optical disk 100 is exposed at a center of the tray bottom portion 31. A central hole of the optical disk 100 is chucked by a clamper portion 42 of the disk motor 40. An optical pickup 44 is movable radially of the optical disk 100 and is exposed from an opening 43 in the tray bottom portion 33. When the tray 3 is inserted into the casing 2, the wing portion 26 is located on the right side of the tray bottom portion 31.

The tray front portion 32 is adjacent to the tray bottom portion 31 and on the front of a center of rotation of the optical disk 100. The center of rotation of the optical disk 100 corresponds to a rotation axis of the disk motor 40 or a center of the clamper portion 42. An inner side surface 50 (a first tapered surface) of the tray front portion 32 is an arcuate portion facing an outer periphery of the optical disk 100 with a gap. The inner side surface 50 functions as a draft taper (draft angle) and is slopingly formed. A front surface panel 54 closing the opening in the casing 2 is mounted to a front surface of the tray front portion 32. In FIG. 3, the front surface panel 54 is omitted.

The tray rear portion 33 is adjacent to the tray bottom portion 31 and on the rear of the center of rotation of the optical disk 100. An inner side surface 60 of the tray rear portion 33 is sloped and rising from the tray bottom portion 31. It extends circumferentially of the optical disk 100, and faces the outer periphery of the optical disk 100 with a gap. The inner side surface 60 is formed as a draft taper like the inner side surface 50 of the tray front portion 32, and constitutes a first tapered surface in the present invention.

An upper surface 62 of the tray rear portion 33 is separated into an upstream side and a downstream side of a rotational direction of the optical disk 100 (i.e. a direction of an arrow 110 in FIG. 3). The upstream portion includes a tapered surface 64 and a flat surface 66. The tapered surface 64 constitutes a second tapered surface in the present invention. The tapered surface 64 slopes in a fore/aft direction so as to have an increasing height toward the rear and is formed to have an increasing width toward the rear. A positional relationship between a front end 70, which is a lower end of the tapered surface 64, and a rear end 72, which is an upper end of the tapered surface 64, is described in terms of the rotational direction of the optical disk 100 that the front end 70 is located upstream of the rotational direction of the optical disk 100, and the rear end 72 is located downstream thereof.

The front end 70 is continuous, without a step, with an upper surface 74 at a higher level than the tray bottom portion 31 by a height of the inner side surface 60. The front end 70 may be continuous, without a step, with a surface at the same level as the tray bottom portion 31. The rear end 72 is continuous without a step with the flat surface 66. The flat surface 66 is located at the highest level in the tray rear portion 33, and the connector portion 25 of the bottom case 21 is placed below the flat surface 66 (see FIG. 1). When the connector portion 25 is placed in a different position, the flat surface 66 may be omitted, and the rear end 72 of the tapered surface 64 may be located at a rear edge of the entire tray rear portion 33.

The portion with the tapered surface 64 in the tray rear portion 33 may be considered to constitute a wedge portion generally having a wedge shape. In this case, an upper surface of the wedge portion is constituted by the tapered surface 64. An inner side surface of the wedge portion is constituted by a part of the inner side surface 60 continuous with the tapered surface 64, and constituted by an arcuate surface with a changing height according to the slope of the tapered surface 64. An outer side surface of the wedge portion is constituted by a part of a side surface of the tray rear portion 33, and constituted by a surface extending in parallel with the fore/aft direction.

Figure 4:
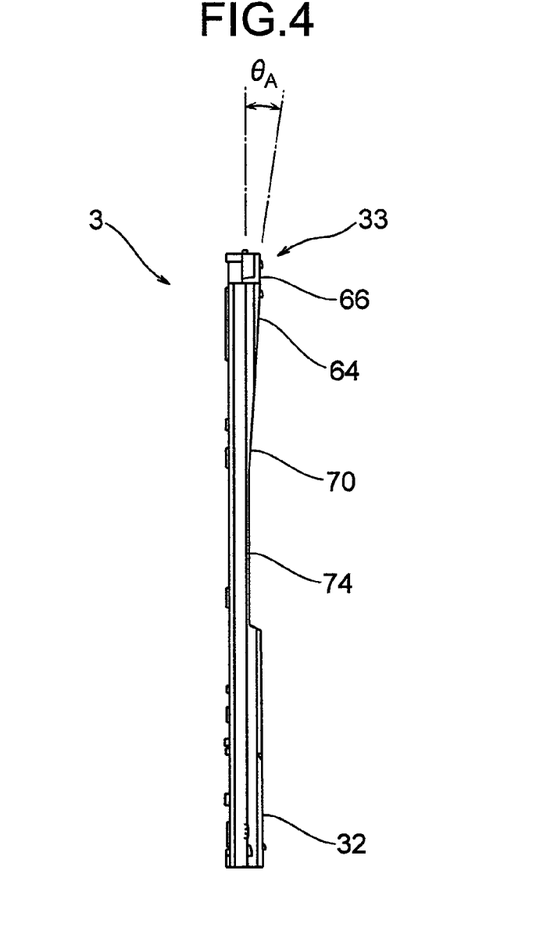
FIG. 4 is a left side view of essential portions of the tray in FIG. 3.
Figure 5:
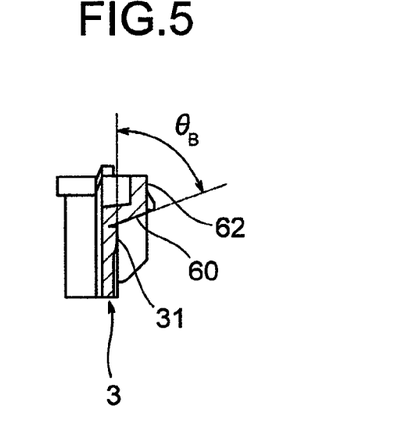
FIG. 5 is a sectional view taken along the line V-V in FIG. 3.

As shown in FIGS. 4 and 5, an inclination angle $\theta A$ of the tapered surface 64 is smaller than an inclination angle $\theta B$ of the inner side surface 60. Examples of the inclination angles $\theta A$ and $\theta B$ are $0°<\theta A<50°$ and $43°<\theta B<70°$. An inclination angle $\theta A$ of more than $50°$ produces an excessively high gradient of the tapered surface 64, and a function of the tapered surface 64 of reducing air noise may become insufficient. An ideal angle of the inclination angle $\theta A$ is determined within the above range. When the angle $\theta A$ is within the range, the angle $\theta B$ which can minimize the angle $\theta A$ is within the above range. A more preferable inclination angle $\theta A$ is $3°$, and an inclination angle $\theta B$ at this time is $60°$.

Figure 6:
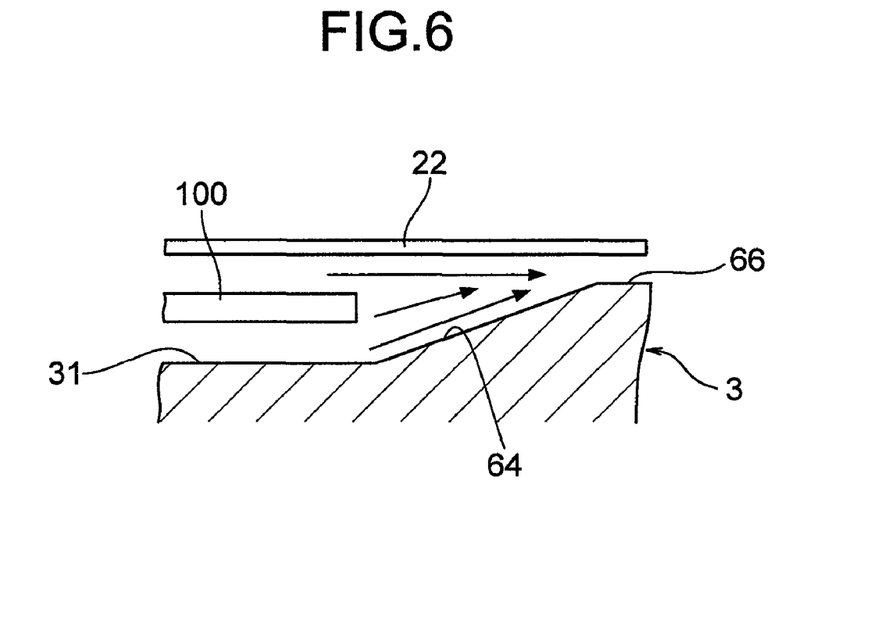
FIG. 6 is a schematic sectional view of airflow in a tray rear portion of the tray in FIG. 3.
Figure 7:
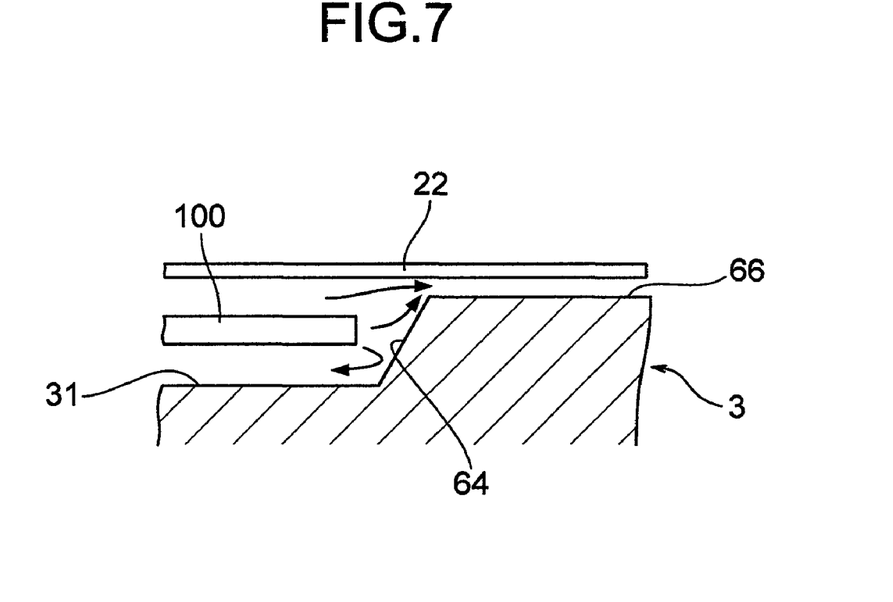
FIG. 7 is a schematic sectional view of airflow in a tray rear portion of a tray in a comparative example.

Next, with reference to FIGS. 6 and 7, an operation of the tapered surface 64 will be described. FIG. 6 is a schematic view of airflow in the tray rear portion 33 of the embodiment. FIG. 7 is a schematic view of airflow in a tray rear portion of a comparative example including no tapered surface 64.

In the comparative example in FIG. 7, a gap between an outer periphery of an optical disk 100 and an inner side surface 60 is small, and an inclination angle of the inner side surface 60 is relatively large. Thus, air in the peripheral portion of the optical disk 100 generated by rotation flows at a high velocity, and tends to hit the inner side surface 60 and flow below the optical disk 100.

On the other hand, in the embodiment in FIG. 6, the tapered surface 64 sloping more gently than the inner side surface 60 is provided. Thus, air in the peripheral portion of the optical disk 100 generated by rotation flows at a lower speed, and tends to be released upwardly along the tapered surface 64 and is prevented from flowing below the optical disk 100.

With the tray 3 of the embodiment described above, the inner side surface 60 or the first tapered surface can be used as a draft taper, and another tapered surface 64 can reduce a flow rate of air in the peripheral portion of the optical disk 100 generated during rotation of the disk. Further, the airflow can be introduced along the slope in the fore/aft direction of the tapered surface 64 to the rear of the center of rotation of the optical disk 100. This allows the airflow in the peripheral portion of the optical disk 100 to be laminarized, and can reliably reduce wind noise generated by the air.

Particularly, in general use of an optical disk device, a front surface panel 54 is often located in front of a user. When loud wind noise is generated in front of the user, the noise tends to annoy the user.

From this viewpoint, in the optical disk device 1 of the embodiment, the airflow is introduced to the rear through the tapered surface 64. This can effectively reduce wind noise annoying the user as compared with the case where the airflow is introduced to the front.

Without a tapered surface 64 formed in a tray rear portion 33 in a tray 3, a large amount of air flows from the tray rear portion 33 to the wing portion 26, which tends to increase wind noise in the wing portion 26.

In this respect, in the tray rear portion 33 in the embodiment, the tapered surface 64 is formed upstream in the rotational direction of the optical disk 100, thereby allowing air to be released to the rear at an early stage before the wing portion 26. This can prevent air from flowing from the tray rear portion 33 to the wing portion 26, thereby reducing wind noise in the wing portion 26.

Further, in the tapered surface 64, the upstream portion (front end 70) in the rotational direction of the optical disk 100 is located at a lower level than the downstream portion (rear end 72), and thus air flowing in the same direction as the rotational direction of the optical disk 100 can be easily introduced along the flow from the front end 70 to the rear end 72. In addition, the tapered surface 64 has an increasing width toward the rear, and thus air can be further easily released to the rear. The above advantage is particularly achieved for the optical disk device 1, that is, an optical disk device including a slim casing.

Next, modified embodiments of the above tray 3 will be described.

First Modified Embodiment

Figure 8:
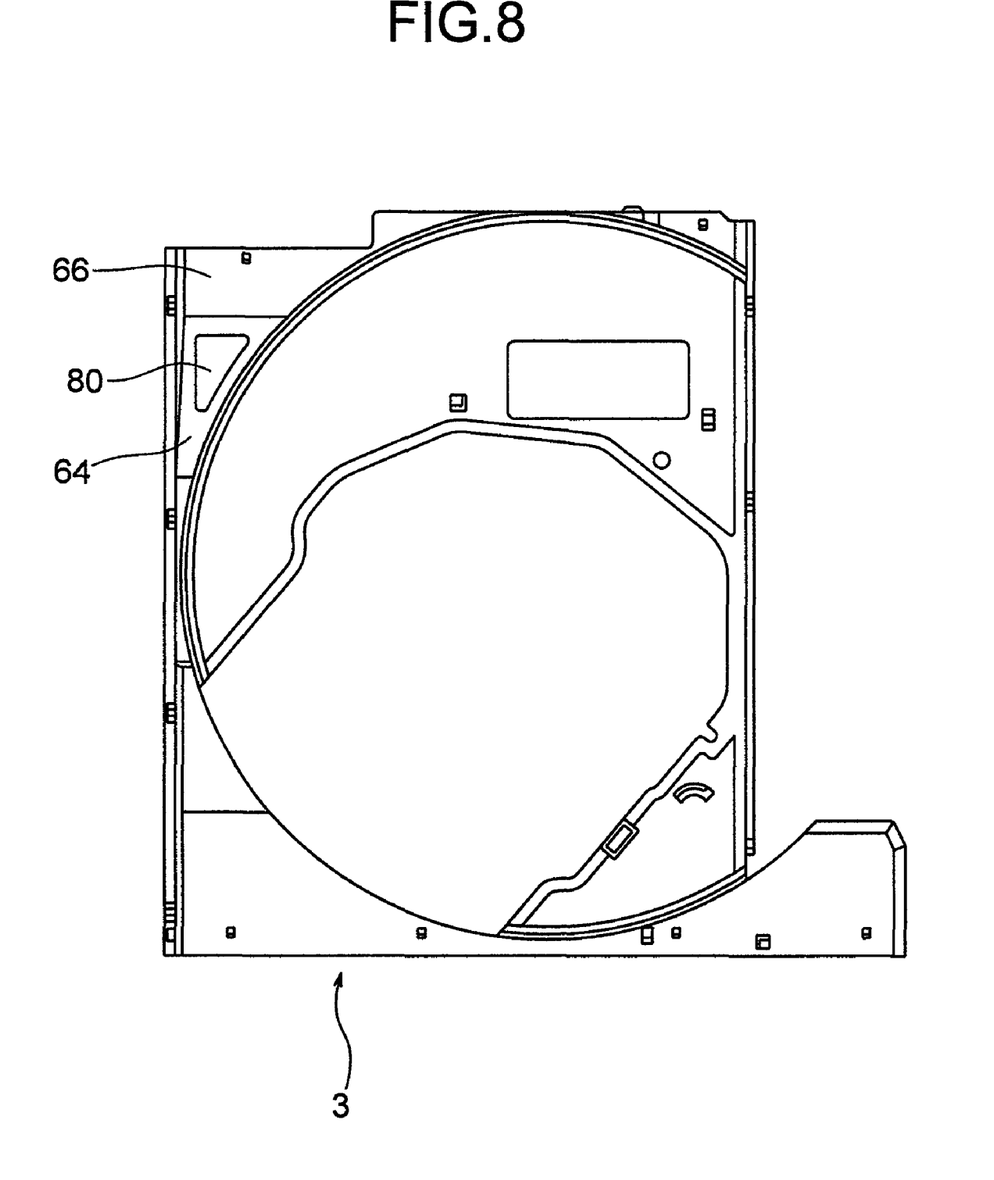
FIG. 8 is a plan view of a tray according to a variant of the present invention.

As shown in FIG. 8, a hole 80 may be formed in the tapered surface 64 of the tray 3. The hole 80 preferably passes through the tapered surface 64 while it may be a closed-end depression or recess. The hole 80 has a trapezoidal shape on plan view, but the shape, position, size and range thereof may be appropriately designed.

Figure 9A:
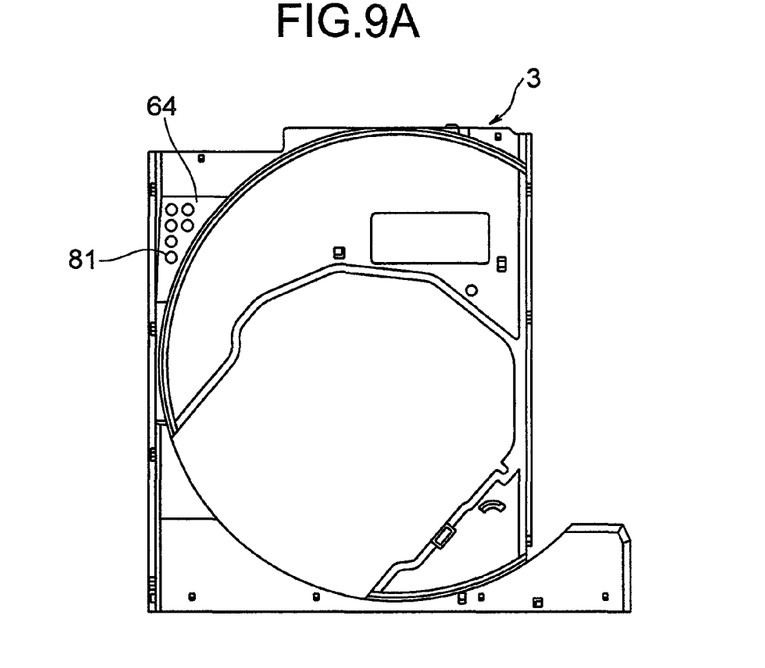
FIGS. 9A to 9F are plan views of trays according to variants of the present invention.
Figure 9B:
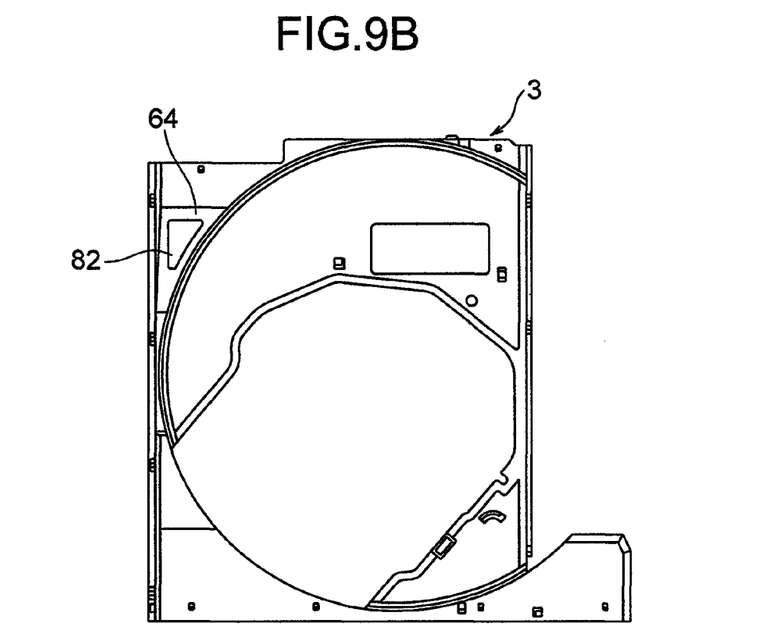
Figure 9C:
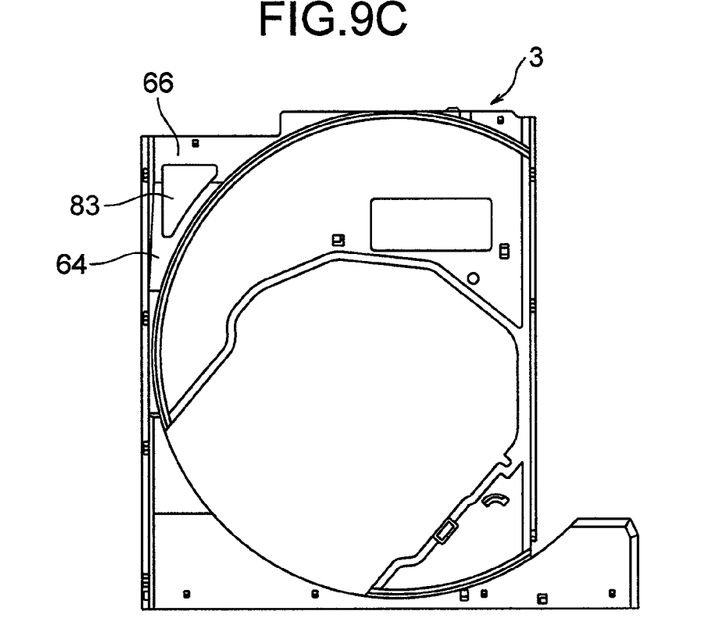
Figure 9D:
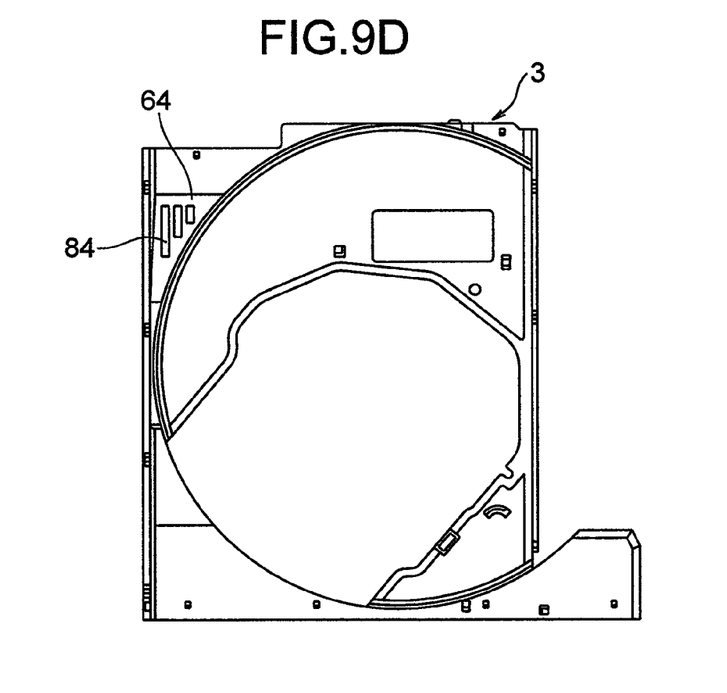
Figure 9E:
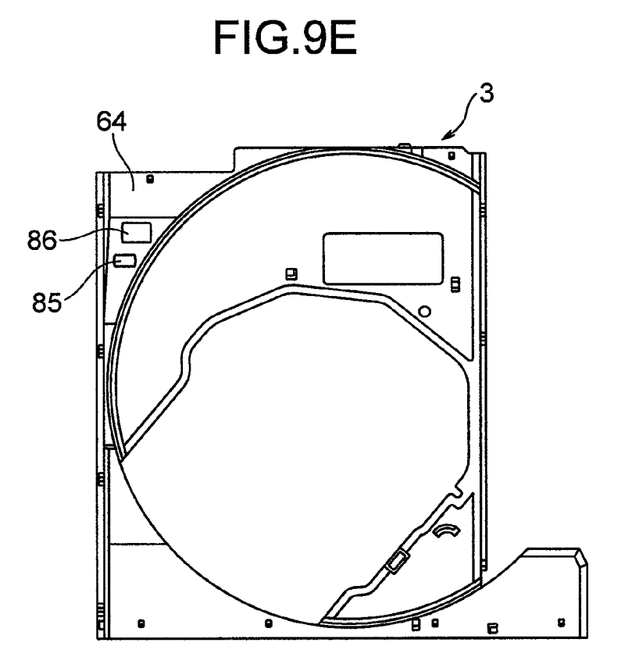
Figure 9F:
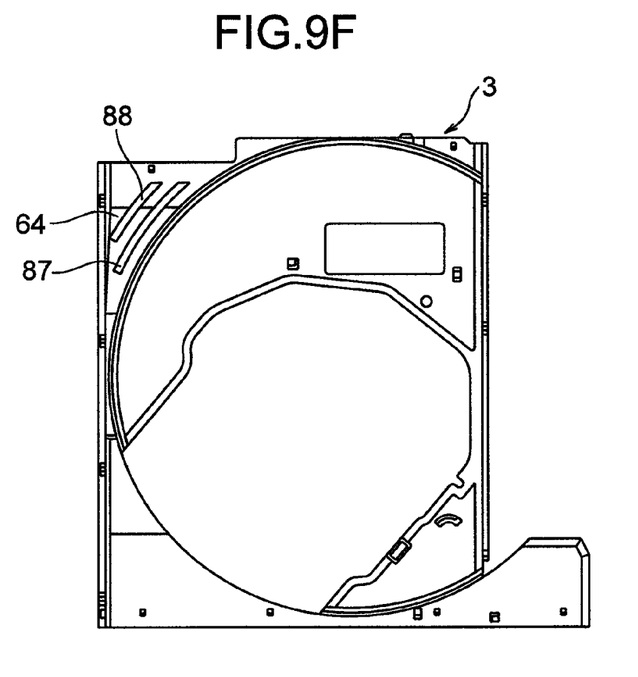

For example, the hole 80 may comprise a plurality of circular holes 81 as shown in FIG. 9A, or a triangular hole 82 on plan view as shown in FIG. 9B. It may also comprise a hole 83 extending over both the tapered surface 64 and the flat surface 66 as shown in FIG. 9C, a plurality of rectangular holes 84 having different lengths as shown in FIG. 9D, two holes 85 and 86 having different shapes as shown in FIG. 9E, or two arcuate holes 87 and 88 having the same center of curvature as the inner side surface 60 as shown in FIG. 9F.

In the tray 3 having the holes 80 to 88, air flowing along the tapered surface 64 (i.e. air generated by rotation of the optical disk 100) is fed below the tapered surface 64. Thus, air in the peripheral portion of the optical disk 100 is introduced to the rear, and also a part of the air can be released to the bottom case 21 located below, thereby further reducing wind noise.

Second Modified Embodiment

Although the tapered surface 64 slops in the fore/aft direction in the above embodiment, the sloping direction of the tapered surface 64 is not limited thereto as long as the upper end 72 of the tapered surface 64 is located farther from the center of rotation of the optical disk 100 than the lower end 70.

For example, the tapered surface 64 may slope in a direction of an arrow 120 in FIG. 3 so as to rise toward the left from a lower end to an upper end. Alternatively, the tapered surface 64 may slope in a direction of an arrow 122 in FIG. 3 so as to rise radially outwardly of the optical disk 100 from a lower end to an upper end.

The position of the tapered surface 64 is not limited to the left rear portion of the tray rear portion 33. For example, the tapered surface 64 may be formed on an upper surface in a right rear portion of the tray rear portion 33. Also in this case, an upper end of the tapered surface 64 is located farther from the center of rotation of the optical disk 100 than a lower end. For example, when the tapered surface 64 is formed in a portion 130 of the upper surface 62 in FIG. 3, the tapered surface 64 may slope in a direction of an arrow 124 in FIG. 3 so as to rise toward the right from a lower end to an upper end.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A tray of an optical disk device, comprising:
   a tray bottom portion configured for an optical disk to be inserted from a front end of the tray so as to be placed on the tray bottom portion for rotational movement; and
   a tray rear portion adjacent to the tray bottom portion on a rear of a center of rotation of the optical disk and located at a higher level than the tray bottom portion, the tray rear portion including:
      a first tapered surface having a first slope rising from the tray bottom portion and extending circumferentially of the optical disk, and
      a second tapered surface having a second slope less than the first slope of the first tapered surface and formed so that an upper end is located farther from the center of rotation of the optical disk than a lower end,
   wherein the upper end of the second tapered surface is located downstream of the lower end of the second tapered surface in a rotational direction of the optical disk.

2. The tray according to claim 1, wherein the second tapered surface is located upstream in the rotational direction of the optical disk in the tray rear portion.

3. The tray according to claim 2, wherein the second tapered surface slopes in a fore/aft direction so as to have an increasing height toward the rear.

4. The tray according to claim 3, wherein the second tapered surface is formed to have an increasing width toward the rear.

5. The tray according to claim 2, wherein the tray rear portion has a flat surface continuous with the upper end of the second tapered surface, and a connector portion is placed below the flat surface.

6. The tray according to claim 2, wherein a hole is formed in the second tapered surface.

7. The tray according to claim 6, wherein the hole passes through the second tapered surface.

8. The tray according to claim 2, wherein the second tapered surface has an inclination angle of less than 50°.

9. The tray according to claim 8, wherein the second tapered surface has an inclination angle of 3°.

10. The tray according to claim 2, wherein the first tapered surface is formed as a draft taper.

11. The tray according to claim 2, wherein the second tapered surface constitutes an upper surface of a wedge portion generally having a wedge shape.

12. The tray according to claim 11, wherein at least a part of the first tapered surface constitutes a side surface of the wedge portion.

13. An optical disk device comprising the tray of an optical disk device according to claim 1.

\* \* \* \* \*